June 11, 1940. W. GATERMAN Re. 21,481

ATTACHMENT FOR MOWING MACHINES

Original Filed April 8, 1937 4 Sheets-Sheet 1

INVENTOR.
WILLIAM GATERMAN

BY

Wheeler, Wheeler & Wheeler
ATTORNEYS

June 11, 1940. W. GATERMAN Re. 21,481
ATTACHMENT FOR MOWING MACHINES
Original Filed April 8, 1937 4 Sheets-Sheet 2
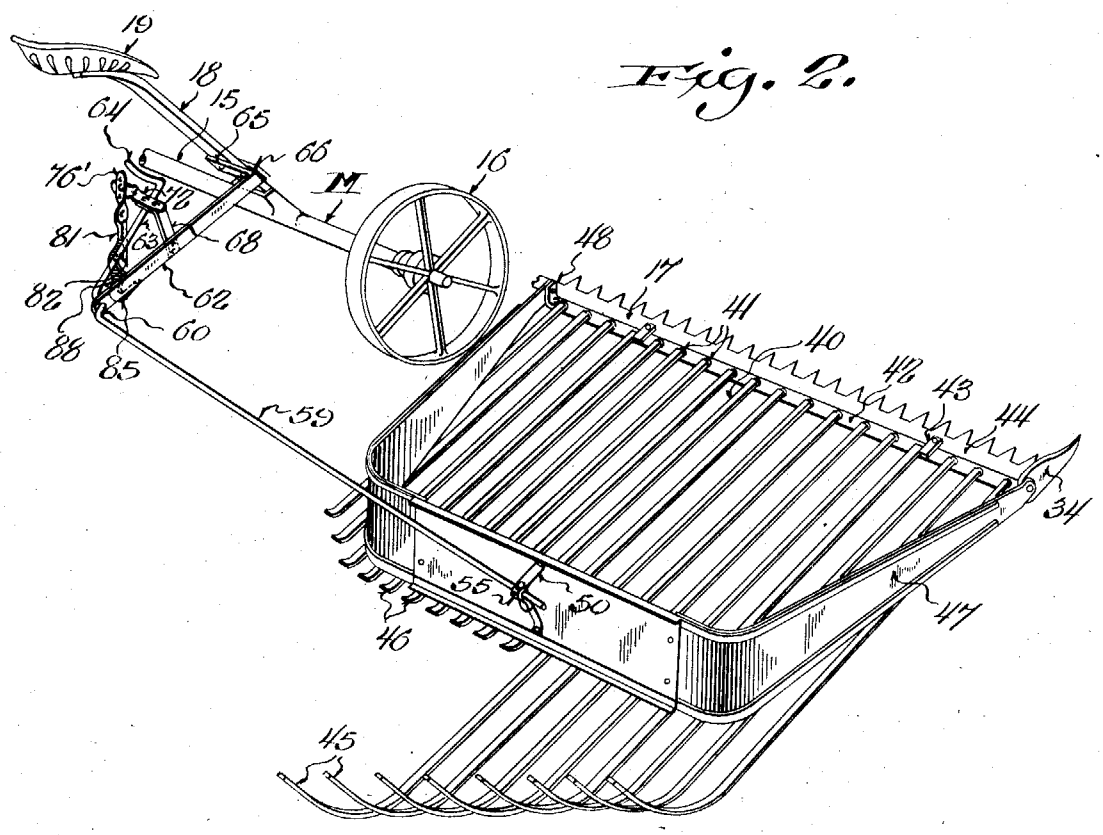
INVENTOR.
WILLIAM GATERMAN
BY
Wheeler, Wheeler & Wheeler
ATTORNEYS.

June 11, 1940. W. GATERMAN Re. 21,481
ATTACHMENT FOR MOWING MACHINES
Original Filed April 8, 1937 4 Sheets-Sheet 3
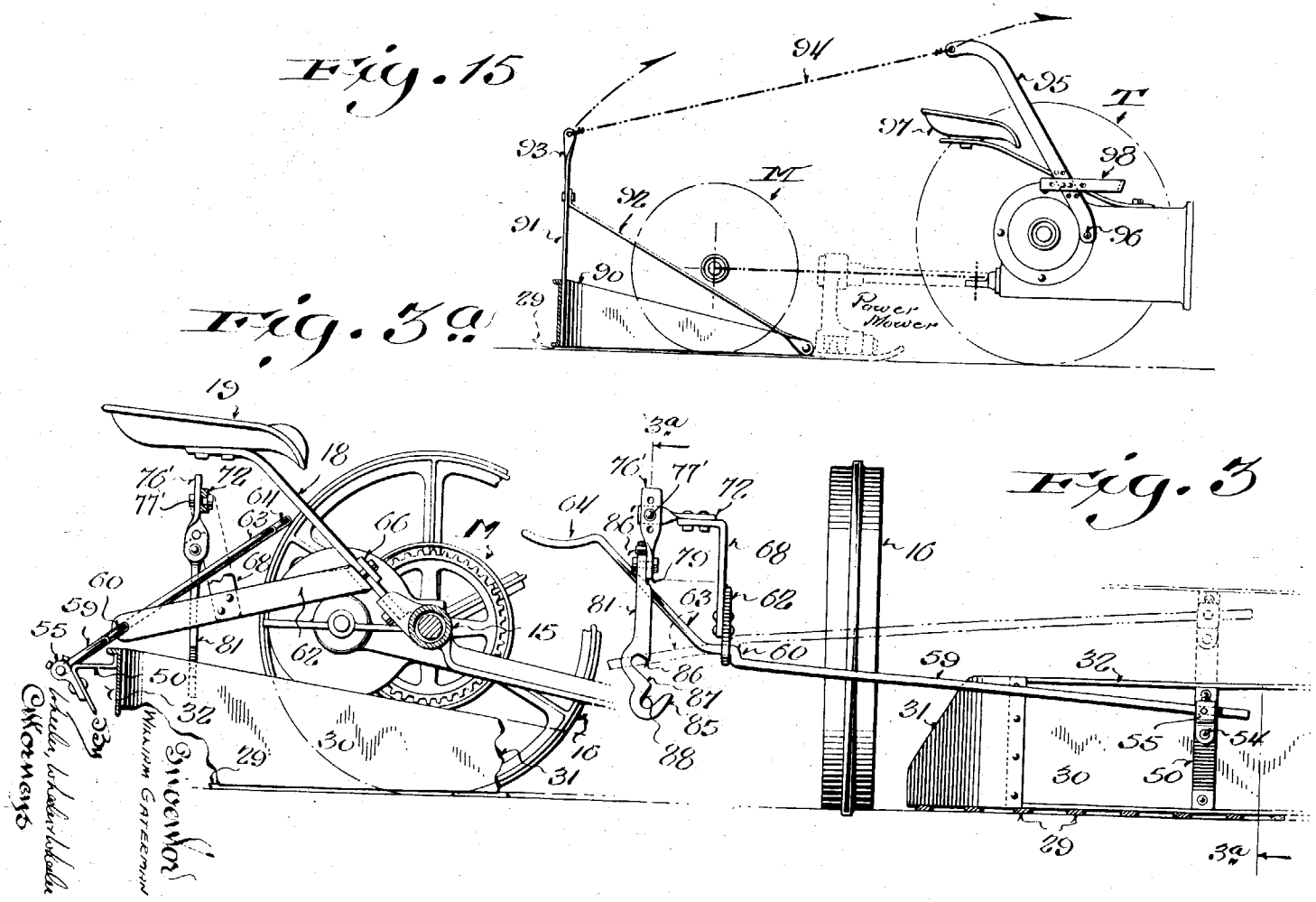

June 11, 1940. W. GATERMAN Re. 21,481
ATTACHMENT FOR MOWING MACHINES
Original Filed April 8, 1937 4 Sheets-Sheet 4
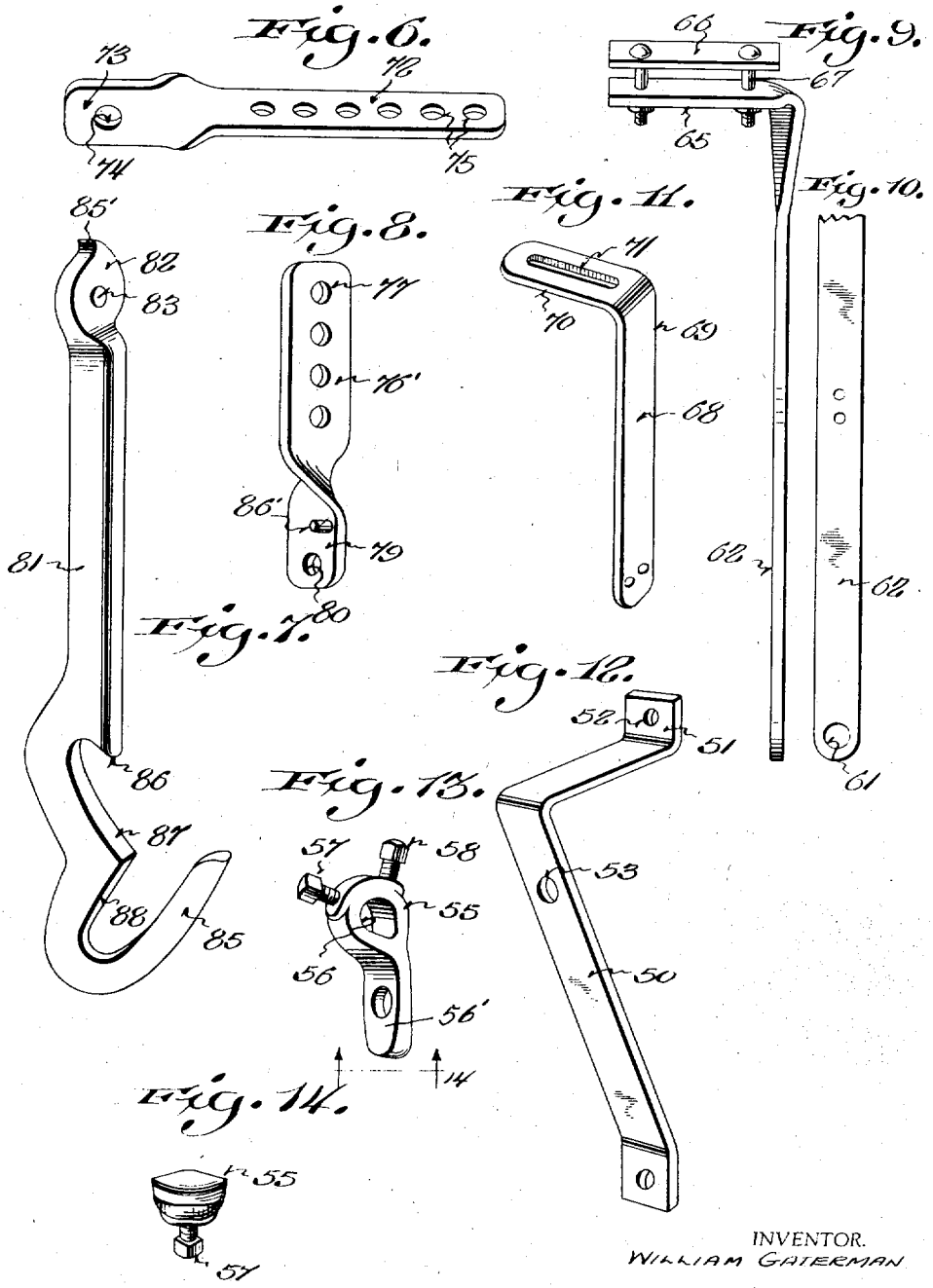
INVENTOR.
WILLIAM GATERMAN
BY
Wheeler, Wheeler & Wheeler
ATTORNEYS Reissued June 11, 1940

Re. 21,481

UNITED STATES PATENT OFFICE 21,481

ATTACHMENT FOR MOWING MACHINES

William Gaterman, Manitowoc, Wis.

Original No. 2,121,428, dated June 21, 1938, Serial No. 135,715, April 8, 1937. Application for reissue December 31, 1938, Serial No. 248,910

14 Claims. (Cl. 56—205)

This invention appertains to harvesting, and more particularly to an improved attachment for mowing machines.

It has heretofore been proposed to provide harvesting attachments for mowing machines, in which the cut crops can be laid either in windrows or bunches to facilitate the gathering thereof. However, all such attachments, with which I am familiar, fail to effectively accomplish their purpose. In most instances, the short material is lost before the same is bunched or laid in windrows; in other machines the increased draft is objectionable, and the turning around of the machine is difficult.

Therefore, one of the salient objects of my invention is to provide a novel harvesting attachment for mowing machines, which will be free of the above mentioned objections, and which is so constructed that the cut crops can be laid either in bunches or windrows at the will of the operator without material loss of the short stuff.

Another important object of my invention is the provision of a novel attachment for mowing machines in which the cut material can be laid either in windrows or bunches at the will of the operator and out of the way of the mowing machine and the draft animals or tractor on the next round, so that no seed will be lost and the crop will not be injured in any way.

A further object of my invention is the provision of novel means for forming the bars, or slats, of the attachment, whereby the bars, or slats, will be free to swing, so as to facilitate the riding of the bars over uneven ground and obstacles, and to facilitate the turning around of the machine.

A further important object of my invention is the provision of an attachment for mowing machines, in which the loss of all short material is precluded by the employance of means for bunching the cut material adjacent to the cutter, or finger-bar, of the mowing machine, with means upon the release of the bunched material for guiding the same to one side of the machine, whereby the bunches will be out of the way on the next round.

A still further object of my invention is to provide an improved attachment of the above character for mowing machines, which will be durable and efficient in use, one that will be simple and easy to manufacture, and one which can be applied to conventional mowing machines at a small cost.

With these and other objects in view, the invention consists in the novel construction, arrangement, and formation of parts, as will be hereinafter more specifically described, claimed, and illustrated in the accompanying drawings, in which:

Figure 2 is a perspective view of my improved attachment, showing the same attached to a fragment of a mowing machine, the attachment being of a slightly different character from that shown in Figure 1, and of the type for delivering the cut material in such a position that the draft animals and the wheels of the mower will straddle the cut crop, either in bunches or windrows.

Figure 3 is an enlarged, fragmentary sectional view of a part of the attachment, illustrating the novel operating means employed for raising the buncher hopper or basket, to permit the release of a formed bunch of material.

Figure 3—A is a fragmentary sectional view taken at right angles to Figure 3, illustrating the operating means employed for raising the buncher hopper or basket.

Figure 4:
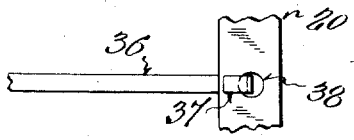

Figure 4 is a fragmentary, detail plan view, illustrating the means of rockably connecting one of the bars or slats of the attachment to the supporting plate.

Figure 5:
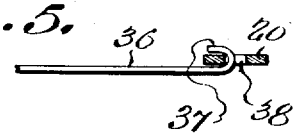

Figure 5 is a detail transverse section through the supporting plate, illustrating the novel means employed for connecting one of the bars or slats of the attachment therewith.

Figure 6 is an enlarged, detail perspective view of the supporting bracket for the swinging latch or supporting hook of the lift device.

Figure 7 is an enlarged, detail perspective view of the latch or supporting hook for the lift device.

Figure 8 is a detail perspective view of the link employed for rockably connecting the latch or supporting hook with its supporting bracket.

Figure 9 is an enlarged, detail rear elevation of the main supporting bracket for the lift device.

Figure 10 is a fragmentary side elevation of the same.

Figure 11 is an enlarged, detail perspective view of the supporting foot or bracket employed for connecting the supporting arm or bracket of the swinging latch or hook with the main supporting bracket of the lift device.

Figure 12 is an enlarged, detail perspective view of the bracket for connecting the lift rod with the hopper or basket.

Figure 13 is an enlarged, detail perspective view of the cuff employed for connecting the lift rod with its bracket.

Figure 14 is a bottom end elevation of the cuff.

Figure 15 is a fragmentary, longitudinal sectional view illustrating the invention connected with a tractor and one means for operating the buncher hopper from said tractor.

Referring to the drawings in detail, wherein similar reference characters designate corresponding parts throughout the several views, the letter M generally indicates a mowing machine, and the letter A my improved attachment therefor.

The mowing machine M can be of any preferred character or make, and includes the frame 15 supported by suitable wheels 16. The frame has hingedly connected thereto in the ordinary manner the swinging cutter, or finger-bar, 17. The frame 15 has also connected therewith in any preferred manner a support 18 for the driver's seat 19.

Figure 1:
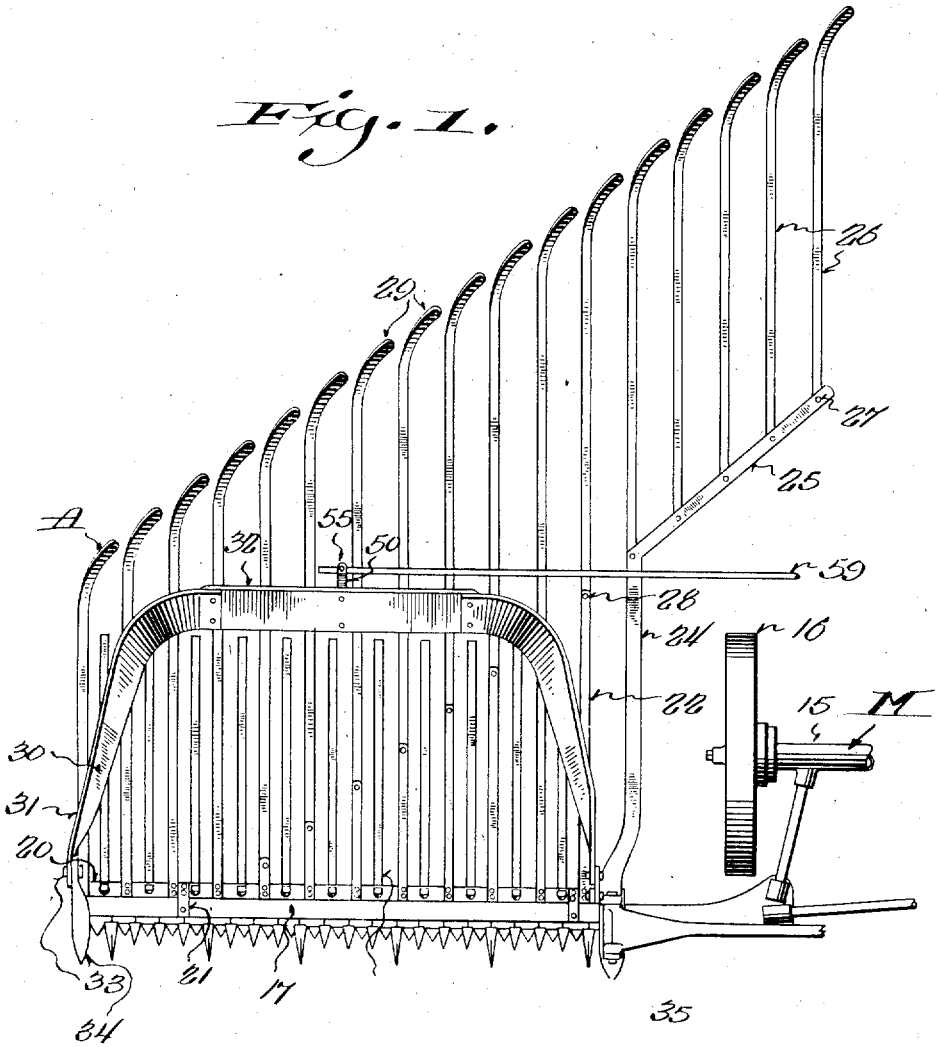
Figure 1 is a top plan view of my improved device applied to a mowing machine, only a fragment of the mowing machine being shown, the attachment being of the character adapted to deliver the cut material entirely out of the path of the mowing machine on the next round.

As shown in Figure 1, my improved attachment A consists of an elongated supporting plate 20, which extends parallel with the cutter, or finger-bar, 17 of the mowing machine M, and the supporting plate 20 is rigidly connected with the bar 17 in any preferred manner, such as by the use of yokes, or straps, 21.

Rigidly connected with the supporting plate 20 is a plurality of equidistantly spaced, rearwardly extending parallel flat bars, or slats 22. These slats successively decrease in length toward the outer, or left-hand, side of the machine (see Figure 1), for a purpose which will be later set forth.

It is also to be noted that I provide a relatively heavy bar 24 disposed adjacent to the inner end of the cutter, or finger-bar, and that the outer end of the relatively heavy supporting bar 24 is angled rearwardly and laterally, as at 25. This angled portion 25 of the supporting bar has connected thereto additional, spaced parallel bars, or slats, 26, which are disposed substantially in rear of the mowing machine.

These slats or bars 26 also successively decrease in length toward the left, behind the hopper. All of the slats or bars 26 are connected to the angled portion 25 of the supporting bar 24 by means of vertical pivots 27, so that the said bars 26 can swing in a horizontal plane. If desired, these slats or bars 26 can be made rigid with the supporting bar 24.

The longest of the bars or slats 22 are provided with pivot joints 28 intermediate their ends, so that the rear portions thereof can also swing in a horizontal plane. By referring to Figure 1, it will be noted that the pivot points of the rear swinging ends of the bars or slats 22 approach closer to the finger- or cutter-bar 17 at the left-hand side of the machine.

The extreme ends of all of the slats or bars 22 and 26 are provided with upwardly and laterally curved extensions 29. These curved extensions prevent the bars from catching on the ground and facilitate the turning and delivery of the cut material to one side of the mowing machine.

Arranged on top of the slats or bars 22 is my novel buncher or hopper 30. This buncher or hopper 30 is of a substantially U-shape in plan, and is preferably formed from sheet metal of the desired gauge.

As shown, the buncher or hopper includes rearwardly extending, inwardly inclined side walls 31 and a connecting rear wall 32. The forward ends of the side walls 31 extend over the cutter or finger-bar 27 and are pivotally mounted upon horizontal pivots 33 carried by the end guard shoes or lifters 34 and 35.

In use of this form of my invention, the mowing machine M is operated in the ordinary way, and as the crop is cut the same is collected on the bars, or slats, 22. The hopper, or buncher, 30 will prevent the material cut from passing over these bars, or slats, and the material will be effectively gathered in a bundle or bunch.

When the bundle or bunch is of the desired size, the hopper, or buncher, 30 is raised, and the bunch is then allowed to feed rearwardly against the curved portions 29 of the bars, or slats, which guide the bunch in rear of and to one side of the machine, and completely out of the way of the machine on its next round.

As the bunch is formed directly adjacent to the cutter, or finger-bar, loss of short stuff is prevented. However, when extremely small stuff is being harvested, I can utilize supplemental slats, or bars, 36, and these slats, or bars, 36 are placed intermediate the slats, or bars, 22.

Hooks 37 are formed on the forward ends of the slats, or bars, 36, and the same are placed in enlarged openings 38 formed in the supporting plate 20. By this arrangement, the supplemental slats, or bars, 39 are permitted to rock both in a vertical and horizontal plane, which allows the riding of these slats over uneven ground and other obstacles.

When the mower is being turned around, the outer ends of the slats 22 rock on their pivots 28, and the slats 26 rock on their pivots 27, which allows the slats to readily follow the machine around a curve, and hence facilitates the ease of travel of the mowing machine. The supplemental slats will also rock in a horizontal plane during the turning of the machine.

The hopper, or buncher, 30 is raised and lowered in a novel manner, which will be later described in detail.

Referring more particularly to Figure 2, it can be seen that I have shown a slightly modified form of my invention, and in this form the bunches or windrows, as the case may be, are guided and dropped in such a manner that the mowing machine on its next round will straddle the bunches or windrows, and the draft animals can walk on each side of the bunches or windrows.

Thus, in this form of my invention shown in Figure 2, I employ relatively short slats, or bars, 40, which have their forward ends hooked in the manner shown in Figures 4 and 5, and these hooked ends are placed through suitable openings 41 in a supporting plate 42. This supporting plate 42 is connected by means of straps 43 to the rear edge of the finger-bar 44 of the mowing machine.

Particular attention is called to the fact that the slats, or bars, 40 on the outer, or right-hand, side of the attachment are longer than the inner set of bars, and that these long bars, or plates, have their outer ends curved upwardly and laterally of the hopper, as at 45.

The long bars, or slats, are formed progressively shorter in length toward the extreme outer end of the attachment, and the bars and their curved terminals form means for guiding the cut material to its desired point of deposit. The group of short bars, or slats, 40 can also have their rear ends slightly upturned, as at 46, to facilitate their travel over the ground.

Rockably mounted on the slats 40 is the hopper, or buncher, 47, which is of the same character as the hopper, or buncher, 30. In this form, however, one side of the buncher can be pivoted to the outer shoe 34 of the finger-bar, and the other side of the hopper, or buncher, can be pivoted to an upstanding foot 48 formed on the inner end of the supporting plate 42.

By rockably mounting the bars 40 on the supporting plate 42, the bars are enabled to ride over uneven ground and obstructions, and are permitted to follow the mowing machine during the turning thereof.

The hopper, or buncher, 47 is raised and lowered in the same manner as the means employed for raising and lowering the hopper 30, and this raising and lowering means will now be described in detail.

To bring about the raising and lowering of the hopper 30 or 47, as the case may be, I rigidly secure to the rear wall thereof an angle-shaped bracket 50. The ends of the angle-shaped bracket 50 have formed thereon attaching feet 51 provided with openings 52, by means of which the bracket can be bolted or riveted in position.

The body portion of the bracket has formed therein an enlarged opening 53 for the reception of a pivot bolt 54 (see Figure 3). This pivot bolt 54 rockably supports a cuff, or sleeve, 55 having formed on one end thereof the arm 56' through which extends the pivot bolt 54.

The bore 56 of the cuff, or sleeve, has the lower part thereof slightly tapered, and this cuff carries angular related set screws 57 and 58 above the tapered portion of the bore. These set screws are adapted to impinge against the lift rod 59 when the lift rod is placed in said bore.

Thus, the set screws normally urge the lift rod toward the tapered portion of said bore to firmly clamp the lift rod in place.

By loosening the set screws 57 and 58 at the sleeve, or cuff, the hopper can be shifted from side to side to permit the desired adjustment thereof, and the foot lever 64 can be raised or lowered and adjusted to the desired position to suit the operator. The raising and lowering of the foot lever 64 turns the rod 59.

The inner end of the lift rod 59 is provided with an offset bearing portion 60, and this bearing portion is rockably mounted in a bearing opening 61 formed in the main supporting bracket 62. Formed on the offset bearing portion 60 of the lift rod 59 is a lever, or operating arm 63, which in turn has formed on its upper end the foot pedal 64.

The main supporting bracket 62 is rigidly bolted to the frame of the mowing machine M, and the upper end of the main supporting bracket 62 is twisted and has formed thereon the right angularly extending attaching foot 65. This attaching foot 65 extends under the seat support 18 of the mowing machine, and is clamped firmly thereto by the use of a clamp plate 66, which engages the outer face of the seat support. Suitable bolts 67 extend through the clamp plate 66 and the foot 65, so as to draw these members into intimate clamping contact with the opposite sides of the seat support.

Rigidly bolted to the main supporting bracket 62 at a point intermediate its ends is an auxiliary supporting bracket 68. This supporting bracket 68 includes the attaching arm 69 and the right-angularly extending supporting arm 70, which has formed therein the longitudinally extending slot 71.

Adjustably mounted on the supporting arm 70 of the auxiliary bracket 68 is the suspension arm 72. This suspension arm 72 has its outer end twisted at right angles, as at 73, and is provided with a bearing opening 74. A plurality of openings 75 is formed in the body portion of the suspension arm 72 for selectively receiving the adjusting and clamping bolts 76, which extend through the slot 71.

An adjustable link 76' is rockably mounted on the twisted end 73 of the suspension arm, and the body portion of the link is provided with a plurality of bearing openings 77, any one of which is adapted to receive the supporting pivot bolt 77', which extends through the bearing opening 74 of the suspension arm.

The lower end of the link 76 is twisted at right angles, as at 79, and has formed therein the bearing opening 80. The link 76 rockably supports the latch lever 81, which is of a particular construction, which will be set forth in detail.

The extreme upper end of the latch lever 81 has formed thereon the right-angularly extending attaching ear 82 and the bearing opening 83. A pivot bolt 84 extends through the openings 80 and 83, and pivotally unites the latch lever to the link. A dog, or stop lug, 85' is formed on the pivot ear 82, and a stop pin 86 is carried by the lower twisted end 79 of the link in the path of the lug 85', so as to limit the swinging movement of the latch lever in one direction.

The extreme lower end of the latch lever 81 has formed thereon a hook 85, the bill of which extends materially beyond the inner face of the latch lever. The latching lever lies at one side of the operating arm 63 of the lift rod 59, and the hook 85 is disposed below the operating arm to limit the downward swinging movement thereof.

Above the hook 85 the latch lever 81 is provided with a keeper nose 86, and the edge of the lever below the nose 86 curves outwardly away from the nose, as at 87, toward the bill of the hook 85. The curved portion 87 of the latch lever extends at an angle to the inclined portion 88 of the body of the hook 85.

When the operator desires to drop a bunch of the cut material, a downward thrust is exerted on the foot pedal 64, which will rock the offset bearing portion 60 of the lift rod in the bearing opening 61, and bring about the raising of the outer end of the lift rod and the elevation of the hopper, or buncher, 30 or 47, as the case may be. Obviously, during the swinging of the lift rod, the cuff, or sleeve, 55 can rock on its pivot 54.

As the operating arm 63 swings downwardly, the same will move against the body portion of the latch lever 81 and swing the latch lever on its pivots 78 and 84. When the operating arm 63 rides past the keeper nose 86, the latch lever will swing back and move the nose over the arm 63, and thus retain the arm in its depressed position, and the hopper, or buncher, in its elevated position.

Upon continued downward movement of the arm 63, the same will be guided by the inclined face 87 into the hook 85. The hook will limit further downward movement of the arm, and upon release of pressure on the pedal 64 by the operator, the weight of the hopper will tend to swing the arm 63 back to its elevated position.

The arm will ride on the inclined face 88 of the bill of the hook, and will be guided past the nose 86 before the latch lever 81 can swing back to its locked position.

Obviously, when windrows are being formed, the arm 63 is left latched in its depressed position for holding the hopper raised.

In Figure 15 I have shown my improved device connected with a tractor T, which can be of any desired character or make. Any desired type of drawbar or the like can be employed for connecting my device to the drawhead or other part of the tractor.

In this form of my invention the buncher hopper or basket 90 is pivotally connected at its forward end to the cutter bar in the same manner as in the forms of my invention previously described. Adjacent to the rear end of the buncher an upstanding rigid arm 91 is secured thereto, and this arm can be braced in any desired manner, such as by the downwardly and forwardly inclined brace bar 92. The upper end of the arm 91 is preferably twisted at right angles, as at 93, and has secured thereto a pull chain or cable 94. This cable extends toward the tractor T and is secured to the upper angle end of an operating hand lever 95. The lower end of the hand lever 95 is rockably secured, by means of a pivot bolt 96, to an appropriate part of the frame of the tractor, such as to the differential housing.

The lever 95 is preferably arranged adjacent to the seat 97 of the tractor, whereby the lever can be conveniently operated by the driver of the tractor. In order that the lever can be actuated from the foot, a suitable pedal 98 or the like can be secured to the lever adjacent to the lower end thereof. The lever and the pedal can be provided with a plurality of openings, whereby adjustment of the pedal can be had.

By swinging the lever forwardly, the hopper wall 30 may be raised to release the bunched material at a substantial distance in front of the upturned rear ends 29 of the trailing bars or slats. Due to its frictional contact with the ground between the slats, the bunched material ceases its forward movement and the slats are drawn underneath it until the upturned rear ends are brought into contact with it with a compacting and laterally pushing action, which effects a bodily delivery of the bunch to the space in the rear of the bull wheels of the mowing machine.

The mode of operation above described is quite different from that of the ordinary windrowing attachment, in which the cut material gradually accumulates against the upturned end portions of the slats, with much of it finding considerable anchorage between the slats, and some short or straight portions being allowed to escape between the slats before such escape is blocked by other material accumulating against their upturned ends.

By my improvement, all of the material is first gathered and massed by the hopper wall 30 against the portion 32 thereof, and since no portions of the stalks or fiber can extend through this wall, the contacting portions are turned to a position of parallelism with the wall. When the wall is raised, some of the stalks may react resiliently, but enough of them will remain substantially parallel with the portion 12 of the wall so that the entire bunch will immediately commence to move laterally when struck by the upturned ends of the slats, the bunch being delivered bodily substantially with a kicking action instead of having portions detained by anchorage between the slats. Such anchorage tends to disintegrate the bunch by delaying delivery of portions thereof.

My improved buncher or hopper wall is also effective to accumulate the cut material in proximity to the cutter and finger-bar, whereby the mass is accumulated before the combing effect of the stubble can swing any large percentage of the stalks to a position of parallelism with the slats. Therefore much waste is prevented, since straight stalks parallel with the slats may pass between them, particularly if allowed to reach the upturned portions 29 while in such positions.

It will be observed, in Figure 1, that the portion 32 of the hopper wall is in close proximity to the ends of the auxiliary slats 36, and, therefore, when the auxiliary slats are used, the preliminary bunching of the material may be wholly accomplished with their aid.

It will also be observed, in Figure 15, that the arm 91 extends upwardly from the rear portion of the hopper wall for a substantial distance. This arm is braced against forward stress by the bracing member 92, which has its front end secured to the pivot connection between one of the side arms of the hopper wall and the connector bar 42. By attaching the upper end of the arm 91 to a cable-like connection 94, I am able to elevate the hopper wall from a forwardly distant tractor, such, for example, as a tractor which has been substituted for horses as a means for propelling the mowing machine.

The power to lift the hopper wall may thus be applied through the cable from a point sufficiently distant in a forward direction to avoid objectionable thrust or tension, and also at a sufficient height to avoid objectionable thrust of the hopper wall upon its pivotal connections. Therefore, the hopper wall may be elevated to release bunched material by a simple pull upon a connecting cable, and any suitable means may be employed for applying tension to the cable.

Changes in details may be made without departing from the spirit or the scope of this invention.

I claim:

1. The combination with a mowing machine having a finger-bar, of a windrowing attachment therefor including a plurality of spaced parallel slats extending in rear of the finger-bar, said slats progressively increasing in length toward the inner end of the finger-bar and having upwardly and laterally curved guide portions on their rear ends, at least a portion of said slats being movable in a horizontal plane, and auxiliary slats rockably mounted between the first mentioned slats for movement both in a horizontal and in a vertical plane.

2. In a mowing machine having a finger-bar, an attaching plate secured to the rear edge of the finger-bar, a plurality of spaced parallel slats rigidly connected with the finger-bar, an inner supporting bar connected with the attaching plate having a laterally extending supporting arm, a plurality of slats pivoted to said supporting arm, all of said slats progressively extending a greater distance in rear of the finger-bar toward the inner end of said finger-bar, upwardly and laterally curved guide portions on said slats, certain of the first mentioned slats having vertical pivots intermediate their ends, a bunch former rockably mounted above the slats adjacent to said finger-bar, and auxiliary slats pivotally mounted on the supporting plate for rocking movement both in a horizontal and vertical plane between the first mentioned slats.

3. In a windrower and buncher attachment for mowing machines, a plurality of slats, a bunch former rockably mounted above the slats, a lift rod for the former rockably connected therewith, a supporting bracket rockably supporting the lift rod intermediate its ends, an operating foot pedal for the lift rod, and means for automatically latching the foot pedal in a depressed position, and the former in a raised position.

4. In a windrower and buncher attachment for mowing machines, a plurality of slats extending rearwardly of the finger-bar of the mowing machine, a bunch former rockably mounted above the slats, a bracket, a lift rod rockably mounted intermediate its ends on the bracket, an operating pedal formed on one end of the lift rod, means rockably connecting the other end of the lift rod to the bunch former, means for automatically latching the operating pedal in a depressed position including a latch lever, and means for automatically moving the latch lever to an inoperative position upon further depression of the foot pedal.

5. In a windrower and bunch forming attachment for mowing machines, a plurality of slats extending rearwardly of the finger-bar of the mowing machine, a bunch former rockably mounted above the slats, a supporting bracket, a lift rod rockably mounted intermediate its ends upon the bracket, an operating arm on the lift rod at one side of its pivot, means rockably connecting the other end of the arm to the bunch former, a foot pedal on the operating arm, a supplemental bracket connected with the first mentioned bracket, and a latch lever rockably carried by the auxiliary bracket and arranged in the path of the operating arm.

6. In a windrower and buncher attachment for mowing machines, a plurality of slats extending rearwardly of the finger-bar of the mowing machine, a supporting bracket, a lift rod rockably mounted intermediate its ends on the supporting bracket, an operating arm formed on the inner end of the lift rod at one side of its pivot, means rockably connecting the outer end of the lift rod to the bunch former, an auxiliary bracket secured to the first mentioned bracket, a link rockably mounted on the auxiliary bracket, a latch lever rockably mounted on the link at right angles to the pivot of said link, means for limiting the swinging movement of the latch lever on its link in one direction, said latch lever having a keeper nose disposed in the path of the operating arm for holding the operating arm in a depressed position, and a hook on the lower end of said latch lever for limiting downward movement of the operating arm below a predetermined point, and a guide face on said latch lever extending beyond the keeper nose.

7. The combination with a mowing machine including a frame, a finger-bar extending laterally of the frame, and a seat support on said frame, of a windrowing and bunch-forming attachment comprising a plurality of rearwardly extending spaced parallel slats disposed in rear of the finger-bar, a bunch former rockably mounted above the slats, a supporting bracket rigidly secured to the seat support and extending in rear thereof, a lift rod rockably mounted on the bracket intermediate its ends, an operating arm on the inner end of the lift rod, a foot pedal on said arm, means rockably connecting the outer end of the lift rod to the bunch former, a link rockably supported by the bracket, a depending latch lever pivotally supported by the link, a keeper notch on the latch lever arranged in the path of the operating arm for holding the operating arm in a depressed position after manipulation thereof, a hook on the extreme lower end of the latch lever for limiting downward movement of the operating arm, and a guide face on said lever between the bill of the hook and below the keeper nose for guiding the operating arm away from the keeper nose upon upward movement of said operating arm.

8. In a windrow and buncher attachment for mowing machines, a plurality of slats extending rearwardly of the finger-bar of the mowing machine, a bunch-former rockably mounted above the slats, a bracket on the mowing machine, a lift rod rockably mounted intermediate its ends on the bracket, a cuff rockably mounted on the bunch-former receiving the outer end of the lift rod, means adjustably connecting the cuff to the rod, an operating member on the upper end of the lift rod, means for automatically latching the operating member in a depressed position including a latch lever, and means for automatically moving the latch lever to an inoperative position upon further depression of the operating member.

9. A mowing machine provided with a finger-bar and a series of trailing slats of a length progressively increasing from the outer slat inwardly substantially throughout the length of the finger-bar, said slats being upturned at their rear ends to a sufficient height to provide a deflecting fence extending along an oblique line defined generally by the length of the bars in front of the upturned portions, in combination with a bunching hopper wall normally extending across the slats in front of the upturned rear ends of the shorter slats, and manually operable connections for raising said hopper wall at intervals to release bunched material in the path of the upturned ends of the slats, whereby such bunches may be contacted, compacted and bodily pushed in a lateral direction by said upturned ends during forward movement of the machine.

10. In a mowing machine provided with a side delivery windrowing attachment having a flat portion for trailing movement in the rear of the sickle and finger-bars, said attachment having longitudinal slot-like openings exposing material thereon for contact with the stubble, and also having an upturned rear portion adapted to direct such material inwardly with reference to the swath, the combination therewith of a collecting guard normally disposed across the flat portion of said attachment at a substantial distance in front of said upturned rear portion and movable therefrom to a raised position for delivery of bunched material in the path of said upturned portion.

11. In a mowing machine having a finger-bar provided with a side delivery windrowing attachment composed of trailing spaced elements of unequal length, said elements being upturned at their rear ends along an oblique line spaced from the finger-bar and inwardly and rearwardly divergent from a point in the rear of its outer end portion and the upturned ends being of sufficient height to form a deflecting fence adapted to plow laterally the fibrous material with which it contacts, the combination, with said elements, of a movable hopper wall normally extending across the elements between their upturned rear ends and the finger-bar in a position to normally collect and retain material on the forward portions of said elements, at a substantial distance from their upturned ends, and means, operable at intervals, to remove said wall from its retaining position and allow the upturned ends of the elements to be drawn against the bunched material for a lateral delivery thereof.

12. In a mowing machine having a cutter bar and an associated finger-bar provided with a side delivery windrowing attachment, including a connector bar secured to the finger-bar, and trailing spaced elements upturned at their rear ends along an inwardly and rearwardly extending oblique line, the combination therewith of a hopper wall normally extending across said elements in front of their upturned rear ends and having forwardly extending side portions, pivotally connected to the connector bar, and lifting connections for raising the rear portion of the wall at intervals to allow a bodily delivery of the bunched material into the path of the upturned rear ends of said elements, said upturned ends being of sufficient height to prevent delivery of material over them, whereby their impact upon material at rest compacts it and pushes it laterally with minimum opportunity for engagement between the elements.

13. In a machine of the described class, the combination with cutter and finger-bars, provided with a trailing side delivery attachment having a flat portion upon which cut material may be bunched, of a hopper wall normally resting on the flat portion substantially parallel to the finger-bar and having side arms pivotally supported from the finger-bar at points adjacent thereto, an upwardly extending arm carried by the hopper wall, and adapted to resist forward stress, and a flexible cable-like connection for causing said hopper wall to swing upwardly upon its pivots when tension is applied to the cable from a tractor forwardly distant from the moving machine, the cable connection with said arm being at a sufficient elevation to facilitate swinging movement of the wall about its pivotal connections.

14. In a mowing machine having a finger-bar provided with a set of trailing elements of unequal length, the outer elements being relatively short and the others progressively increasing in length inwardly therefrom, said elements having their rear ends upturned along an oblique line inwardly and rearwardly divergent from the upturned end of the relatively short outer element and of sufficient height to form an obstructing fence,—the combination, with said elements, of a connector bar provided with circular apertures, a set of intermediate relatively short trailing elements adapted to be loosely interlocked in said apertures and being otherwise straight, a hopper wall extending across the first mentioned elements in proximity to the rear ends of the intermediate elements and having side arms pivoted to the connector bar, said wall being adapted to gather cut material in the space above the intermediate elements, and means for temporarily lifting said wall while the machine is advancing, whereby the gathered and bunched material may come to rest in the path of the upturned rear ends of the first mentioned elements preparatory to being struck and delivered laterally by said upturned ends.

WILLIAM GATERMAN.